United States Patent [19]
Muramatsu et al.

[11] Patent Number: 5,552,853
[45] Date of Patent: Sep. 3, 1996

[54] AUTO FOCUSING APPARATUS IN A CAMERA

[75] Inventors: Masaru Muramatsu, Kawasaki; Shigemasa Sato, Yokohama; Sueyuki Ohishi, Shinagawa; Tadashi Otani, Ohtawara, all of Japan

[73] Assignee: Nikon Corporation, Tokyo, Japan

[21] Appl. No.: 519,177

[22] Filed: Aug. 25, 1995

Related U.S. Application Data

[63] Continuation of Ser. No. 424,610, Apr. 17, 1995, abandoned, which is a continuation of Ser. No. 148,536, Nov. 8, 1993, abandoned, which is a continuation of Ser. No. 996,687, Dec. 24, 1992, abandoned.

[30] Foreign Application Priority Data

Jan. 9, 1992 [JP] Japan .................................. 4-002415
Jan. 27, 1992 [JP] Japan .................................. 4-011599
Jan. 27, 1992 [JP] Japan .................................. 4-012298

[51] Int. Cl.⁶ .................................................. G03B 13/36
[52] U.S. Cl. ............................................................ 354/408
[58] Field of Search ....................................... 354/400, 402, 354/403, 408, 406, 407

[56] References Cited

U.S. PATENT DOCUMENTS

| | | | |
|---|---|---|---|
| 4,336,987 | 6/1982 | Shenk | 354/409 |
| 4,344,679 | 8/1982 | Yagi et al. | 354/409 |
| 4,873,543 | 10/1989 | Matsuzak et al. | 354/402 |
| 5,006,700 | 4/1991 | Kosaka et al. | 354/403 |
| 5,053,801 | 10/1991 | Ishida et al. | 354/402 |
| 5,121,151 | 6/1992 | Kawabata et al. | 354/402 |
| 5,191,201 | 3/1993 | Kusaka et al. | 354/408 |
| 5,243,375 | 9/1993 | Ishida et al. | 354/402 |

FOREIGN PATENT DOCUMENTS

| | | |
|---|---|---|
| 62-25716 | 2/1987 | Japan . |
| 63-289537 | 11/1988 | Japan . |
| 1-288813 | 11/1989 | Japan . |

*Primary Examiner*—W. B. Perkey

[57] ABSTRACT

An auto focusing apparatus in a camera comprises a detecting device for detecting the measured distance values of an object corresponding to a plurality of areas in a photographing image field, a first determining device for determining a first measured distance value which is the measured distance value of the shortest distance from the plurality of measured distance values detected by the detecting device, a comparing device for comparing the first measured distance value determined by the first determining device with a threshold value, a second determining device for determining the mean value of the plurality of measured distance values detected by the detecting device as a second measured distance value, and a driving device for driving a photo-taking lens on the basis of the first measured distance value when it is judged by the comparing device that the first measured distance value is smaller than the threshold value, and driving the photo-taking lens on the basis of the second measured distance value when it is judged by the comparing device that the first measured distance value is equal to or greater than the threshold value.

15 Claims, 14 Drawing Sheets

AUTO FOCUSING APPARATUS IN A CAMERA

This application is a continuation of application Ser. No. 08/424,610, filed Apr. 17, 1995, now abandoned, which is a continuation of Ser. No. 08/148,536, filed Nov. 8, 1993, now abandoned, which is a continuation of 07/996,687, filed Dec. 24, 1992, now abandoned.

BACKGROUND OF THE INVENTION

1. Field of the Invention

This invention relates to an auto focusing apparatus in a camera.

2. Related Background Art

There are known auto focusing apparatuses in cameras wherein the measurement of distances is effected in a plurality of areas in a photographing image field and a lens is driven to a distance selected from among them to thereby effect photographing.

In these auto focusing apparatuses, design is made such that one of a plurality of measured distance values obtained from said plurality of areas which is on the nearest side is selected. In the photographing of almost all persons, this makes it possible to take well-focused photographs.

However, where the object is a landscape or the like, it is not always desired to focus the camera on the closest object, and this has led to the disadvantage that the desired object is out of focus.

Further, in case of such photographing as close-up photographing in which the photographing magnification becomes great, the probability with which a main object is in the central portion of the photographing image field is high, but the main object is not always closest. Where like this, the closest object is not a main object, there has been the disadvantage that if photographing is effected by means of a conventional automatic distance measuring apparatus, the main object will be out of focus because in close-up photographing, the depth of field is very shallow.

There is also known an auto focusing apparatus in a camera wherein the distance to an object is measured from the phase difference between two object images formed on an image sensor such as a CCD through two optical systems. In such a conventional auto focusing apparatus, the correlations between the two images on the image sensor are calculated while the two images are scanned in conformity with distance, and a peak at which the correlations between the two images are most coincident with each other is found from the state of the variation in the correlation values, and this point is regarded as the distance to the object.

Also, whether this point should be adopted is determined on the basis of judgment values provided for the height of the peak of the correlations and the sharpness of the peak.

However, in the conventional auto focusing apparatus in a camera, if like a periodic pattern, a plurality of objects similar in shape exist in the distance measuring field, there is a case where a different object is recognized as an identical object and an entirely wrong measured distance value is output (hereinafter referred to as false focusing), and such a case, there has been the problem that the focus deviates greatly.

This false focusing is liable to become conspicuous particularly when an originally far object is focused on the very near side by mistake.

SUMMARY OF THE INVENTION

It is an object of the present invention to provide an auto focusing apparatus in a camera which drives a photo-taking lens to an optimum focus position in both of the photographing of a person or persons and the photographing of a landscape.

It is another object of the present invention to provide an automatic focus adjusting apparatus in a camera in which an optimum focus position is provided in both of ordinary photographing and close-up photographing.

It is still another object of the present invention to provide an auto focusing apparatus in a camera which can reliably prevent the focus from deviating greatly relative to an object for which false focusing will occur.

An auto focusing apparatus in a camera according to the present invention wherein the measured distance values of an object corresponding to a plurality of areas in a photographing image field are calculated and a photo-taking lens is driven from said measured distance values has first calculating means (S2 of FIG. 5 of the accompanying drawings) for calculating from the plurality of measured distance values a first measured distance value which is the measured distance value of the shortest distance, judging means (S3 of FIG. 5) for judging the magnitudes of said first measured distance value and a threshold value, and a second calculating device (S5 of FIG. 5) for calculating a second measured distance value which is the mean value of the plurality of measured distance values, and is characterized in that when said judging means judges that said first measured distance value is smaller than the threshold value, the photo-taking lens is driven by the use of said first measured distance value, and when said judging means judges that said first measured distance value is greater than the threshold value, the photo-taking lens is driven by the use of said second measured distance value.

The present invention is designed such that whether an object to be photographed is at a close distance or at a long distance is judged and an optimum measured distance value is output and thus, it becomes possible to take photographs better in focus irrespective of objects.

The present invention makes the most of the characteristic of the photo-taking lens and it becomes possible to take photographs good in focus irrespective of the long distances of objects.

In the present invention, when the measured distance value of the shortest distance is in the vicinity of the threshold value, more or less fluctuation of the measured distance value greatly affects the measured distance value for driving the photo-taking lens and therefore, the measured distance value for driving the photo-taking lens is found with adaptivity being calculated by the use of third calculating means and with such adaptivity being taken into account and thus, it becomes possible to take photographs stable and good in focus.

The present invention finds the measured distance value for driving the photo-taking lens by the use of a fuzzy process and therefore enables photographs stable and good in focus to be taken.

The present invention makes the most of the characteristic of the photo-taking lens and enables photographs good in focus to be taken irrespective of the long distances of objects.

According to the present invention, in an automatic focus adjusting apparatus in a camera having distance measuring means capable of measuring distance in a plurality of areas on a photographing image field, provision is made of magnification judging means for judging a photographing magnification from the measured distance value by said distance measuring means and the focal length of a lens, and area selecting means for selecting a predetermined area from among said plurality of areas on the basis of the photographing magnification judged by said magnification judging means, and distance measurement is effected by the use of the area selected by said area selecting means.

In the present invention, the photographing magnification of an object is found and a distance measuring area is selected on the basis of the photographing magnification, and distance measurement is effected in the selected distance measuring area, thereby providing the function of obtaining an optimum focus position in both of ordinary photographing and close-up photographing.

The auto focusing apparatus in a camera according to the present invention is an auto focusing apparatus in a camera in which the correlations between two object images formed on an image pickup element through two different optical systems are detected and the in-focus position is detected by the use of the detected correlation value and a predetermined judgment value, having judging means for varying said judgment value in conformity with the object distance.

In the auto focusing apparatus in a camera according to the present invention, the judgment value is varied so as to be gentle setting at a commonly used distance.

In the auto focusing apparatus in a camera according to the present invention, the judgment value is varied so as to be gentle on the far side and be severe setting on the near side.

In the auto focusing apparatus in a camera according to the present invention, the judgment value is varied in conformity with the object distance. The judgment value is varied so as to be gentle setting at a commonly used distance, whereby a point at which the correlations between two images at the commonly used distance are most coincident with each other is preferentially adopted. Also, the judgment value is varied so as to be severe setting on the near side, whereby the possibility of being focused on the near side by mistake is reduced even for an object which will cause false focusing, like a periodic pattern.

DESCRIPTION OF THE PREFERRED EMBODIMENTS

Figure 1:
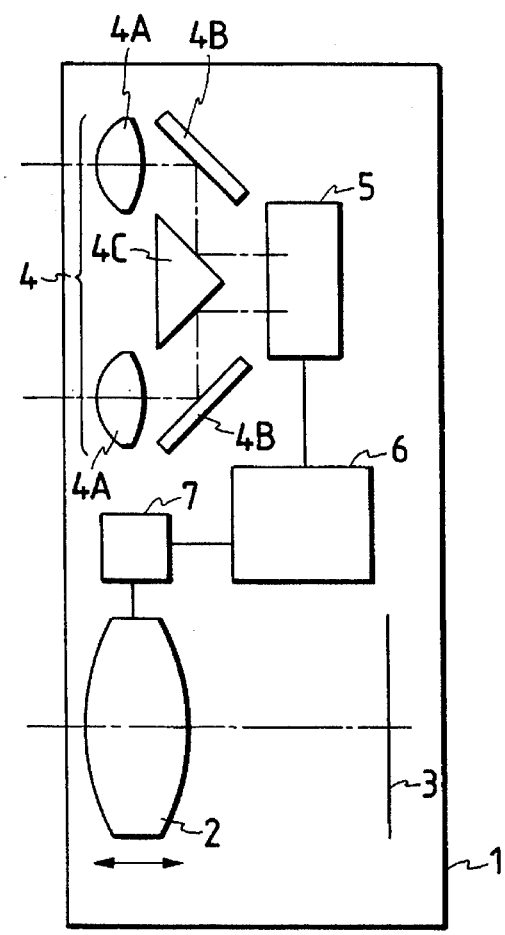
FIG. 1 shows the construction of a camera according to an embodiment of the present invention.

FIG. 1 shows an embodiment of the auto focusing apparatus of the present invention as it is applied to a camera.

Object light passed through a photo-taking lens 2 provided in a camera body 1 is imaged on a film surface 3.

Also, the object light passes through and is condensed by the pair of objective lenses 4A of an auto focusing optical system 4 of the outdoor daylight passive triangular distance measuring type, and the beam of the condensed object light is reflected by a pair of mirrors 4B and 4C.

The light beam is detected as two images on an image sensor 5. The two object images detected by this image sensor 5 are sent to a distance measurement calculating device 6 comprising a microprocessor or the like.

The distance measurement calculating device 6 can find the distance to the object from the spacing between the two detected object images by a conventional technique. Further, it calculates the final measured distance value by effecting the calculations as shown in the flow charts of a first embodiment and a second embodiment which will be described later.

A lens driving device 7 is designed to drive the photo-taking lens 2 to an in-focus position in conformity with the final measured distance value of the distance measurement calculating device 7, whereby the photo-taking lens is focused on the object.

Figure 2:
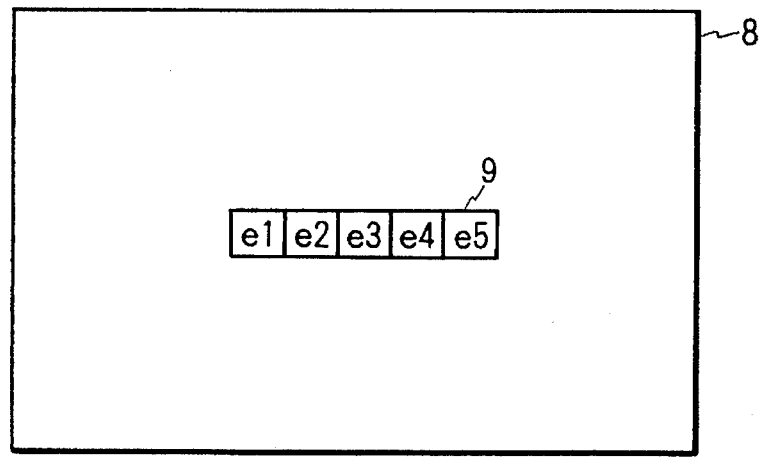
FIG. 2 shows a distance measuring area in a photographing image field according to an embodiment of the present invention.

FIG. 2 shows a distance measuring area 9 in a photographing image field 8 in a first embodiment.

The distance measuring area 9 is divided into five areas as shown in FIG. 2. The distance measurement calculating device 6 calculates five measured distance values e1–e5 of the respective areas by a conventional technique.

The states of the outputs of the five measured distance values obtained from the distance measuring area 9 are shown in FIGS. 3 and 4.

Figure 3A:
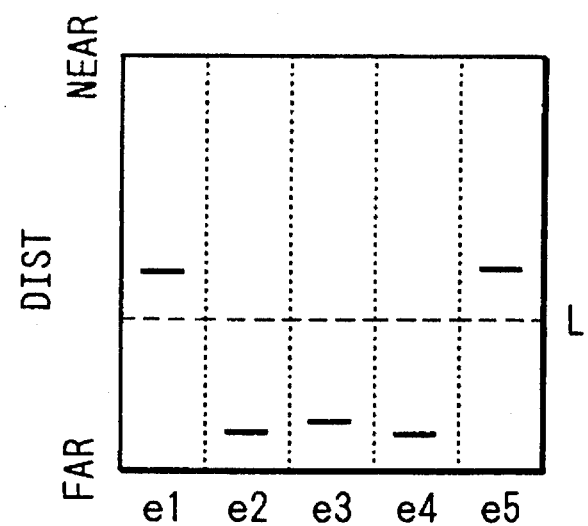
FIGS. 3A and 3B show an example of the output of the measured distance value of an object.
Figure 3B:
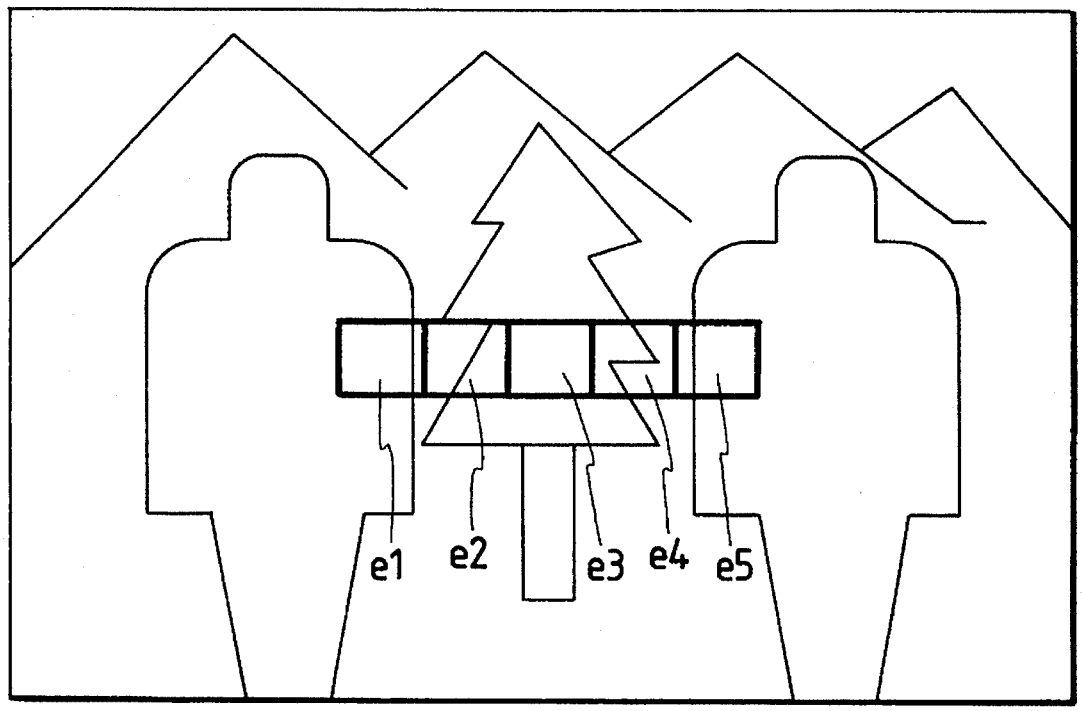

FIG. 3A shows the measured distance values e1–e5 of respective distance measuring areas in a scene including persons as shown in FIG. 3B. As regards the persons in FIG. 3B, the measured distance values measured in the areas e1 and e5 are the outputs of the nearer side than a threshold value L as shown in FIG. 3A. Also, as regards the measured distance value of the background, the measured distance values of the farther side than the threshold value L are outputs in e2, e3 and e4. In such a case, in the first embodiment of the present invention, the measured distance value e1 or e5 of the nearest side is adopted.

Figure 4A:
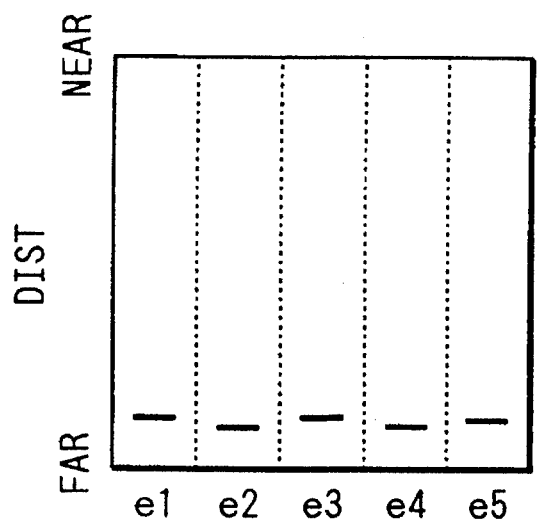
FIGS. 4A and 4B show an example of the output of the measured distance value of an object.
Figure 4B:
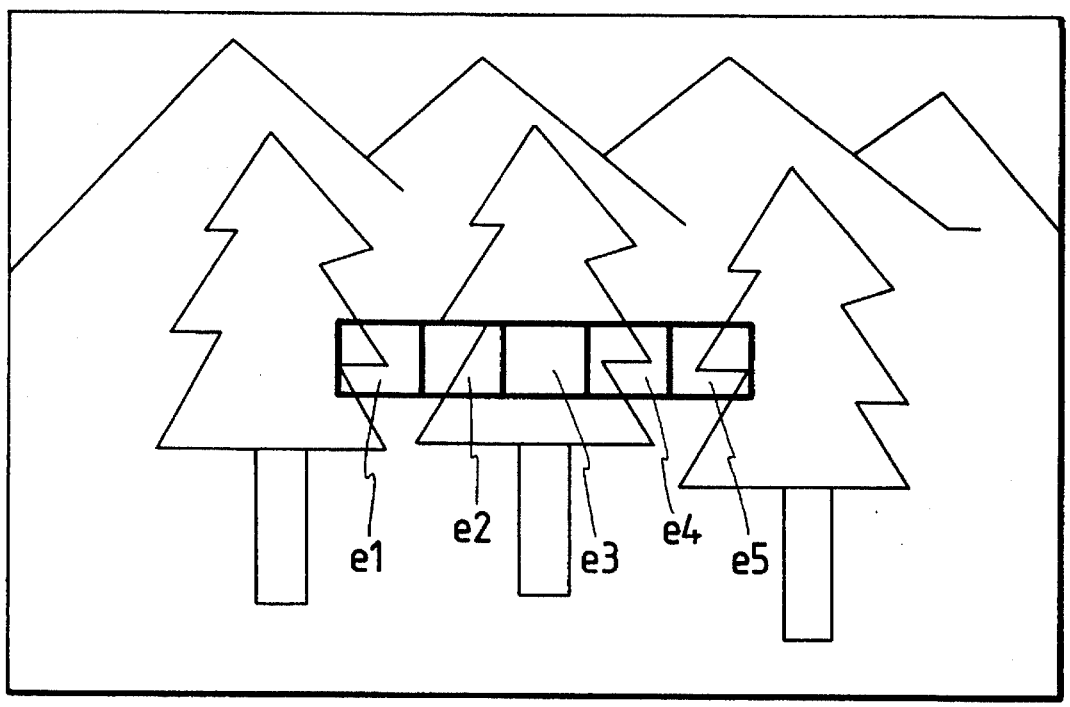

FIG. 4A shows the measured distance value of each distance measuring area in a scene such as a landscape as shown in FIG. 4B, and as shown in FIG. 4A, all the measured distance values are the outputs of the far side. For such a scene as a landscape, in the embodiment of the present invention, the mean value of the measured distance values e1 to e5 is adopted so that the lens may be focused on the whole of the objects.

Judgment as to whether these objects are "a scene including persons" or "a scene such as a landscape" is determined by the closest value of a plurality of measured distance values, and if the closest value is on the near side from the threshold value L, the closest value is adopted as "a scene including persons", and if the closest value is on the far side from the threshold value L, the mean value of the plurality of measured distance values is adopted as "a scene such as a landscape".

The threshold value L used in such judgment is determined to an optimum value by the characteristic of the photo-taking lens, i.e., the focal length or F value, or the supposed usage of the camera.

For example, where the photo-taking lens used is a wide angle lens of short focal length, the threshold value L is set to the near side (for example, in case of a photo-taking lens of 35 mm–50 mm, a distance of the order of 5 to 7 meters to the object). Where conversely, the photo-taking lens used is a telephoto lens of long focal length, it is often the case that persons are at a long distance and therefore, the threshold value can be set to the far side (for example, in case of a photo-taking lens of 70 mm–105 mm, a distance of the order of 8 to 10 meters to the object). Of course, where the photo-taking lens used is a zoom lens, it is also possible to vary the threshold value L to far or near in conformity with the focal length thereof. Also, in case of an interchangeable lens type camera, the threshold value L may be set on the basis of the information of the focal length from the lens side.

Figure 5:
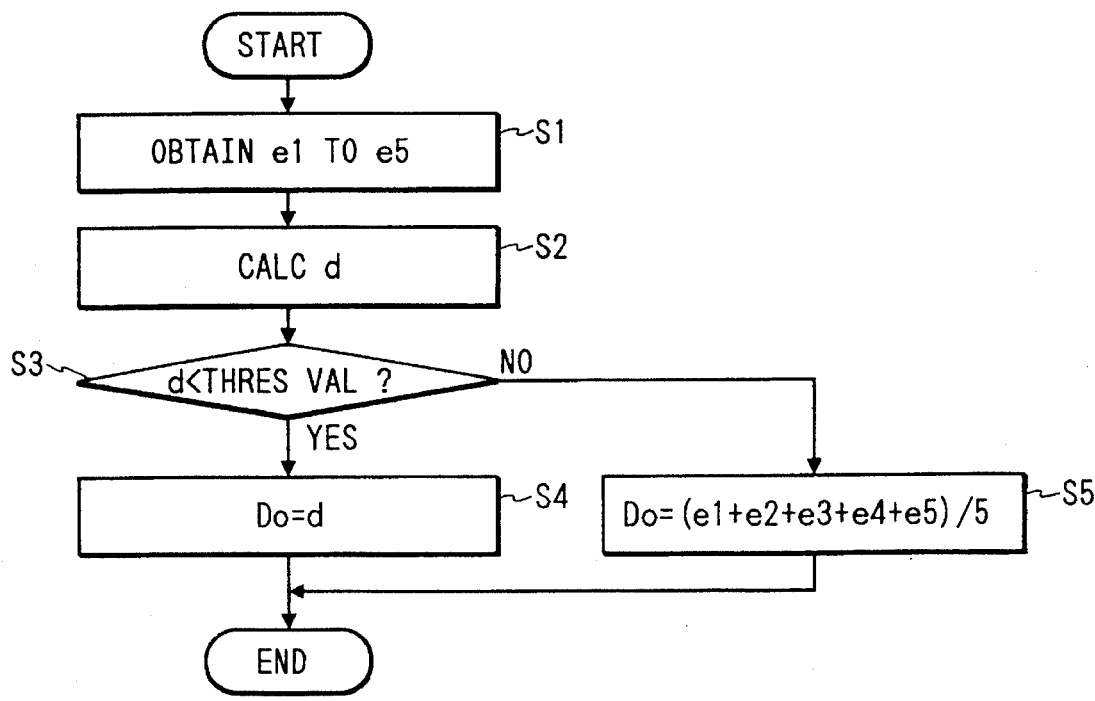
FIG. 5 is a flow chart which is an embodiment.

FIG. 5 is a flow chart illustrating the processing by the distance measurement calculating device 6 of the first embodiment.

Step S1: A plurality of measured distance values e1–e5 are obtained by a conventional calculating method.

Step S2: The closest value d of the measured distance values e1–e5 is calculated.

Step S3: The closest value d is compared with the threshold value L, and if the closest value d is nearer than the threshold value L, advance is made to a step S4, and if the closest value d is farther than the threshold value L, advance is made to a step S5.

Step S4: The closest value d is stored into the final measured distance value $D_0$.

Step S5: The mean value of the measured distance values e1–e5 is found, and this mean value is stored into the final measured distance value $D_0$.

The lens driving device 7 drives the lens by this final measured distance value $D_0$.

The measured distance values measured in the areas e1 and e5 are the outputs of the nearer side than the threshold value L, and if these areas e1 and e5 are close to each other and are in the same depth, the mean value thereof may be adopted. That is, said measured distance values may be a value found from the final measured distance value $D_0=(e1+e5)/2$.

As regards the average of these closest values and the average of the whole of the step S5, weighting averaging may be effected with other parameter, for example, a value indicative of the contrast of the object in each distance measuring area, as a parameter, whereby a measured distance value attaching importance to an area of high contrast may be adopted.

Besides, as a parameter, use may be made of a correlation value obtained from a passive type triangular distance measuring device, or in case of an active type triangular distance measuring device, the intensity of reflection may be used. Herein, description will be made of a case where contrast is used as a parameter.

The measured distance values measured in the areas e1 and e5 are the outputs of the nearer side than the threshold value L, and if these areas e1 and e5 are close to each other and are in the same depth, the contrasts of the areas e1 and e5 are calculated, and the calculated results are defined as c1 and c5. The final measured distance value $D_0$ at this time is found from the following equation:

$$D_0=(e1\cdot c1+e5\cdot c5)/(c1+c5) \qquad (1)$$

Also, the contrasts of the measured distance values measured in the areas e1–e5 are calculated, and the calculated contrasts are defined as c1–c5.

The measured distance value m adopted for "a scene such as a landscape" at this time can be found from the following equation:

$$m=(e1\cdot c1+e2\cdot c2+e3\cdot c3+e4\cdot c4+e5\cdot c5)/(c1+c2+c3+c4+c5) \qquad (2)$$

Also, a wide angle lens or the like is deep in the depth of field and therefore, the threshold value L may be changed to widen the area in which the mean photometric value is adopted, and if the opening of a stop is stopped down, the depth of field becomes deep and therefore, the threshold value L may likewise be changed to widen the area in which the mean photometric value is adopted.

In the first embodiment, one of the closest measured distance value and the mean of all measured distance values is the final measured distance value $D_0$. According to this, where the closest measured distance value is in the vicinity of the threshold value L, more or less difference in the measured distance value may sometimes gives rise to an extremely different final measured distance value $D_0$.

So, a second embodiment is such that whether the object is a person or a landscape is judged by the use of fuzzy processing so that the photo-taking lens can be driven to a position intermediate of a first measured distance value and a second measured distance value.

The following two fuzzy rules are first set to specify the object.

Rule 1: If the closest value is "near", the object is "a scene including persons".

Rule 2: If the closest value is "far", the object is "a scene such as a landscape".

Figure 6:
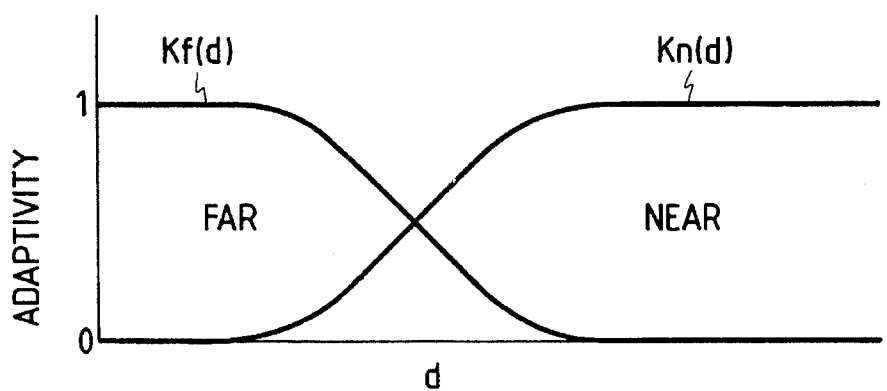
FIG. 6 shows membership functions Kn(d) and Kf(d).

FIG. 6 shows a membership function representative of the adaptivity of the expression that the closest value is "near" and the adaptivity of the expression that the closest value is "far", in a case where the fuzzy processing is used. In FIG. 6, the abscissa represents the closest value d and the ordinate represents the adaptivity.

If in FIG. 6, the closest value of a plurality of measured distance values is d, the degree to which the closest value is adaptive to "near" is Kn(d), and the degree to which the closest value is adaptive to "far" is Kf(d). This membership function is determined to an optimum value by the characteristic of the photo-taking lens, i.e., the focal length, F value or the like. Specifically, a membership function conforming to the characteristic of the photo-taking lens is already programmed as the expression or arrangement of a plurality of straight lines in a microprocessor or the like.

The final measured distance value $D_0$ is found by the following calculation:

$$D_0 = (d \cdot Kn(d) + m \cdot Kf(d))/(Kn(d) + Kf(d)) \quad (3)$$

By thus introducing fuzzy processing, there can be obtained a smooth and stable measured distance value even if the object is near the boundary between "a scene including persons" and "a scene such as a landscape".

The membership function in this case, like the aforementioned threshold value, is also determined to an optimum value by the characteristic of the photo-taking lens.

Figure 7:
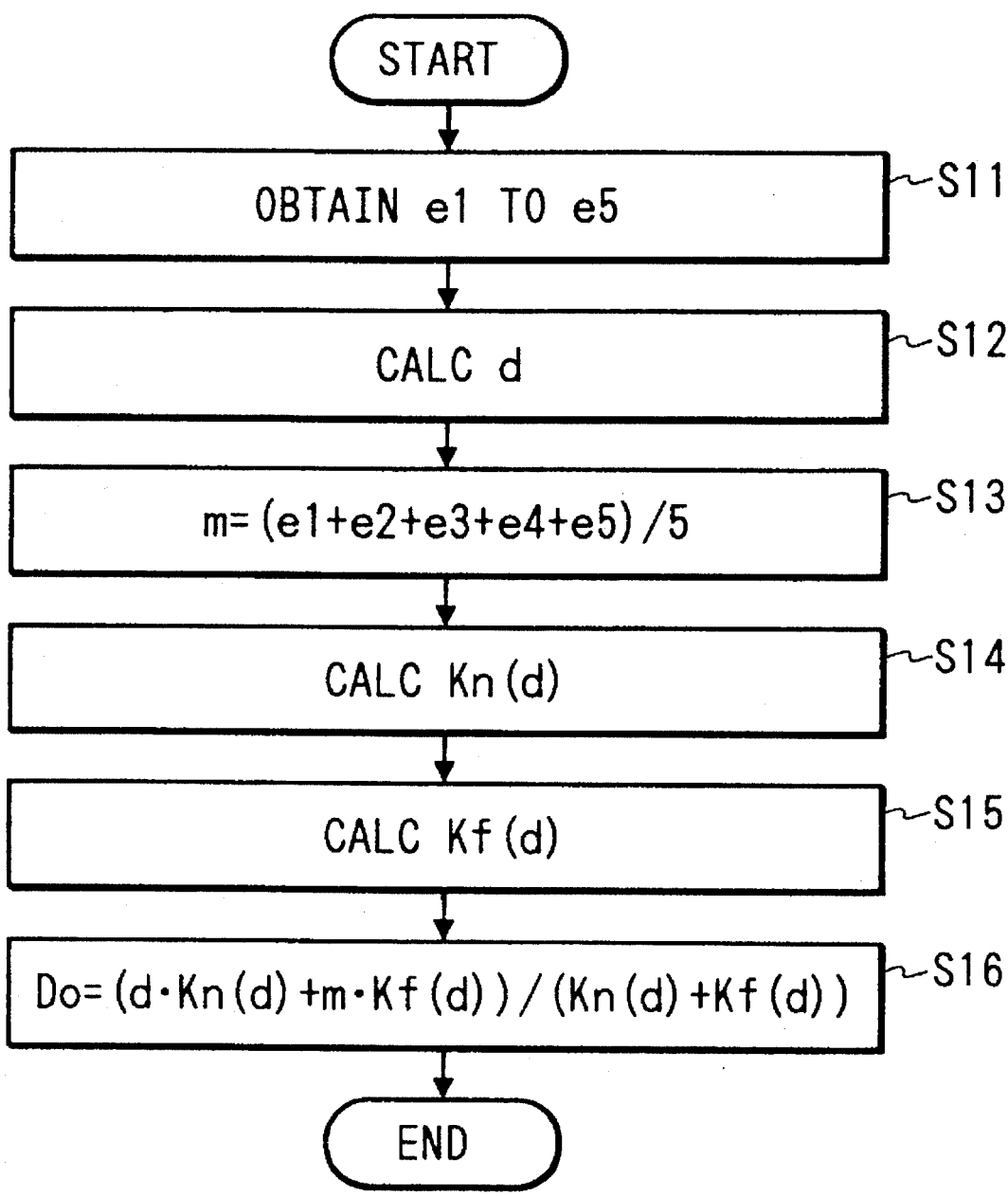
FIG. 7 is a flow chart which is another embodiment.

FIG. 7 is a flow chart illustrating the processing by the distance measurement calculating 1 device 6 of the second embodiment.

Step S11: A plurality of measured distance values e1–e5 are obtained by a conventional method.

Step S12: The closest value d of the measured distance values e1–e5 is calculated.

Step S13: The mean value m of the measured distance values e1–e5 is calculated.

Step S14: The adaptivity of rule 1 is calculated from the membership function Kn(d).

Step S15: The adaptivity of rule 2 is calculated from the membership function Kf(d).

Step S16: The final measured distance value $D_0$ is calculated in accordance with equation (2).

The lens driving device 7 drives the lens by this final measured distance value $D_0$.

In the embodiments of the present invention, use is made of the outdoor daylight type passive triangular distance measuring apparatus, but any auto focusing apparatus such as a TTL type or outdoor daylight type active triangular distance measuring apparatus would be applicable to cameras in which a plurality of areas are distance-measured.

As described above, according to the present invention, design is made such that whether the object to be photographed is a scene including persons or a scene such as a landscape is determined by judging whether a plurality of measured distance values are greater than the threshold value (far or near) and an optimum distance measuring position is output and therefore, if the object is a scene including persons, it becomes possible to take a good photograph attaching importance to the persons, and if the object is a scene such as a landscape, it becomes possible to take a photograph attaching importance to the entire landscape.

Further, according to the present invention, the adaptivity of the measured distance value on the nearest side and the adaptivity of the mean measured distance value on the far side are calculated so that the photo-taking lens can be moved to a position intermediate of the measured distance value on the nearest side and the mean measured distance value on the far side, and the measured distance value by which the photo-taking lens is driven is found with such adaptivities taken into account and therefore, it becomes possible to take photographs of stable and good focus.

Another embodiment of the present invention will hereinafter be described with reference to FIGS. 1, 2 and 8A–10.

Figure 8A:
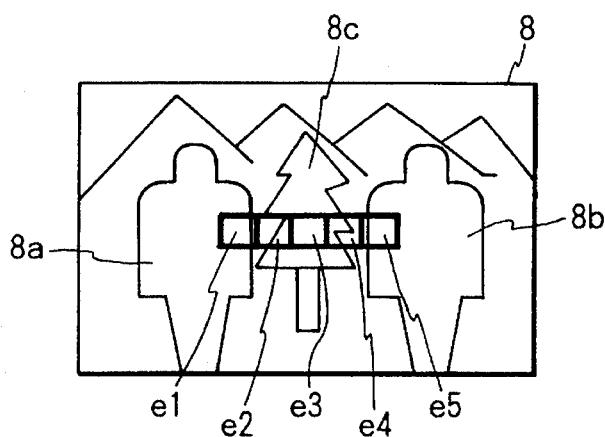
FIGS. 8A and 8B show the states of measured distance values corresponding to objects in the photographing image field of FIG. 2.
Figure 8B:
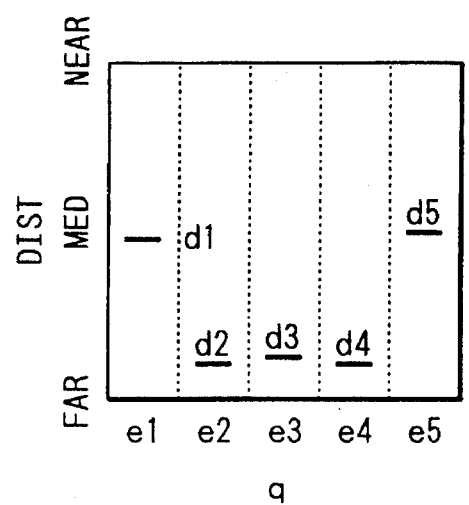
Figure 9A:
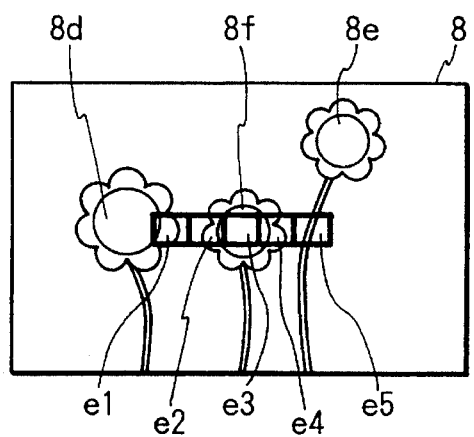
FIGS. 9A and 9B show the states of measured distance values corresponding to objects in the photographing image field of FIG. 2.
Figure 9B:
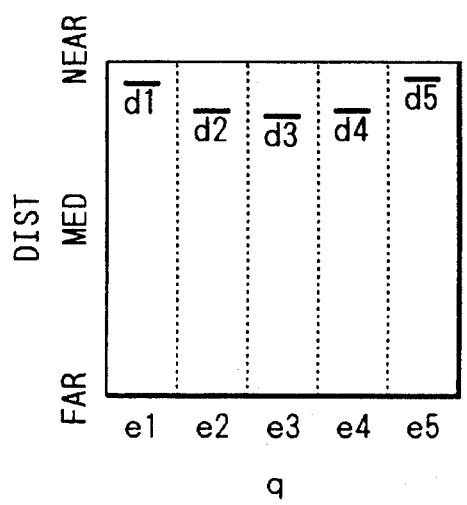
Figure 10:
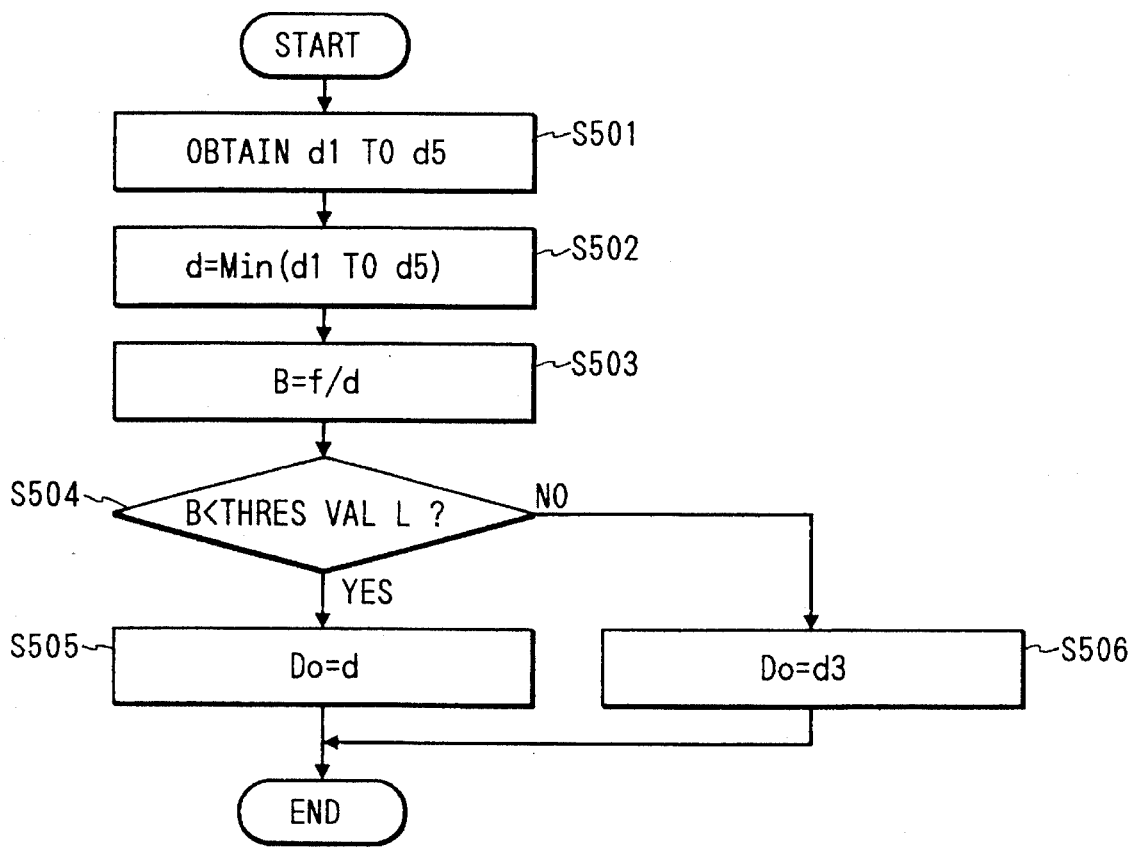
FIG. 10 is a flow chart showing the algorithm of the distance measurement calculating device 6 of FIG. 1 in another embodiment.

FIGS. 8A–9B show the states of measured distance values corresponding to objects in the photographing image field of FIG. 2, and FIG. 10 is a flow chart showing the algorithm of the distance measurement calculating device 6 of FIG. 1.

The construction of another embodiment will first be described with reference to FIGS. 1 and 2.

Referring to FIG. 1, the camera body 1 is comprised of the photo-taking lens 2, the film surface 3, the distance measuring optical system 4, the image sensor 5, the distance measurement calculating device 6 and the lens driving device 7. The distance measuring optical system 4 introduces two object images by a triangular distance measurement type distance measuring optical system. The image sensor 5 detects the two object images passed through the distance measuring optical system 4.

The distance measurement calculating device 6 calculates measured distance values corresponding to the distance measuring areas e1–e5 shown in the photographing image field 8 of FIG. 2 on the basis of the object images detected by the image sensor 5. This distance measurement calculating device 6 discriminates between an ordinary scene to be photographed and a close-up scene to be photographed, whereby in the ordinary scene to be photographed, it is processed by a conventional algorithm which regards the closest measured distance value in the distance measuring areas e1–e5 as the distance to the object, and in the close-up scene to be photographed, it is processed by an algorithm which regards the measured distance value in the central distance measuring area e3 in the photographing image field as the distance to the object. This will later be described in greater detail with reference to FIG. 10.

The lens driving device 7 drives the lens 2 by the output from the distance measurement calculating device 6 and causes the object image to be formed on the film surface 3.

The photographing image field 8 of FIG. 2 is the photographing image field in the finder of the camera. FIG. 2 shows the positional relation between the photographing image field 8 and the distance measuring area 9. This distance measuring area 9 is divided into five areas, which are indicated as distance measuring areas e1–e5.

The operation of the present embodiment will now be described with reference to FIGS. 8A–10.

FIG. 8A shows the situation of the field of an ordinary scene to be photographed which is observed in the photographing image field 8, and FIG. 8B shows the output values of measured distance values detected in the distance measuring areas e1–e5, respectively, of FIG. 8A.

In FIG. 8B, persons 8a and 8b which are main objects are distance-measured by the distance measuring areas e1 and e5, respectively, and as a result, the distance measurement calculating device 6 outputs signals indicative of middle distances as measured distance values d1 and d5. Also, the background 8c is distance-measured by the distance measuring areas e2, e3 and e4 and as a result, the distance measurement calculating device 6 outputs signals indicative of long distances as measured distance values d2, d3 and d4.

FIG. 9A shows the situation of the field of a close-up scene to be photographed which is observed in the photographing image field 8, and FIG. 9B shows the output values of measured distance values detected in the distance measuring areas e1–e5, respectively, of FIG. 4A.

In FIG. 9B, a flower 8f which is a main object is distance-measured by the distance measuring areas e2, e3 and e4 and as a result, the distance measurement calculating device 6 outputs signals indicative of short distances as measured distance values d2, d3 and d4. Also, flowers 8d and 8e are distance-measured by the distance measuring areas e1 and e5 and as a result, the distance measurement calculating device 6 outputs as measured distance values d1 and d5 signals indicative of shorter distances than the measured distance values d2, d3 and d4.

Thus, in the ordinary scene to be photographed shown in FIG. 8A, the lens can be focused on the persons as the main objects on the basis of an empirical rule even if the scene is processed by the algorithm in the distance measurement calculating device 6 which gives priority to the closest distance. However, when this algorithm which gives priority to the closest distance is used for the close-up scene to be photographed shown in FIG. 9A, the lens will be focused on the other objects 8d and 8e than the main object 8f and the focus desired by the photographer will not be obtained because in close-up photographing, the main object 8f is often placed at the center of the photographing image field 8.

So, the distance measurement calculating device 6 judges whether the object to be photographed is an ordinary scene to be photographed or a close-up scene to be photographed, and selects algorithms suitable for the respective scenes to be photographed as shown in FIG. 10 which will be described later.

For the judgment as to whether the object is an ordinary scene to be photographed or a close-up scene to be photographed, use is made of a photographing magnification hereinafter referred to as the closest magnification B=f/d calculated from the closest value d in the measured distance values d1–d5 of the distance measuring areas e1–e5, respectively, and the focal length f of the photo-taking lens, and the threshold value L which is a predetermined value. If the closest magnification B is smaller than the threshold value L, the object is judged to be an ordinary scene to be photographed and the closest value d in the measured distance values d1–d5 is adopted for focusing (an algorithm giving priority to the closest distance). Also, if the closest magnification B is greater than the predetermined value, the object is judged to be a close-up scene to be photographed and the measured distance value d3 of the central distance measuring area e3 is adopted for focusing (an algorithm giving priority to the center). The focal length f of the photo-taking lens 2 is stored in the distance measurement calculating device 6 in the camera body.

The processing by the distance measurement calculating device 6 will now be described with reference to FIG. 10.

At a step S501, a plurality of measured distance values d1–d5 are obtained by a conventional technique.

At a step S502, the closest value d in the measured distance values d1–d5 is calculated.

At a step S503, the closest magnification B is found from the closest value d and the focal length f of the photo-taking lens.

At a step S504, the closest magnification B is compared with the threshold value L, and if the closest magnification B is smaller than the threshold value L, advance is made to a step S505, and if the closest magnification B is greater than the threshold value L, advance is made to a step S506.

At the step S505, the closest value d in the measured distance values d1–d5 is stored into the final distance measurement result $D_0$ (the algorithm giving priority to the closest distance).

At the step S506, the measured distance value d3 corresponding to the central distance measuring area e3 in the photographing image field 8 is stored into the final distance measurement result $D_0$ (the algorithm giving priority to the center).

The camera drives the photo-taking lens 2 in accordance with the final result $D_0$.

Still another embodiment of the present invention will now be described with reference to FIGS. 11 and 12. The only difference of this embodiment from the above-described embodiment is the algorithm of the distance measurement calculating device 6 and therefore, this difference alone will hereinafter be described.

Figure 11:
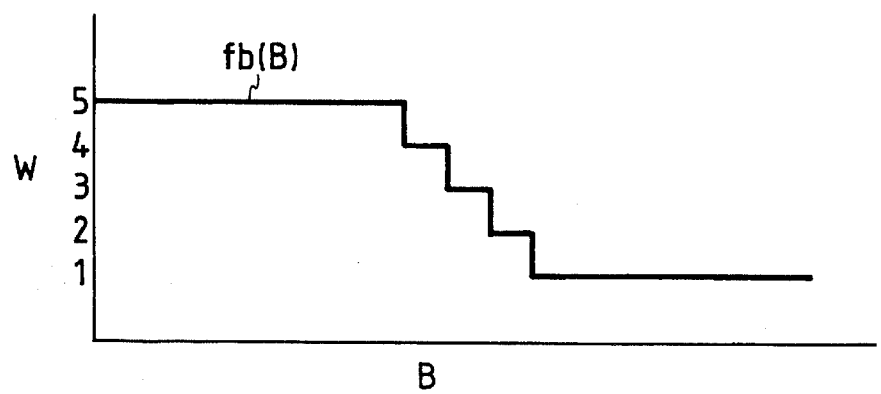
FIG. 11 is a graph showing the relation between the closest magnification B and the distance measuring area width W in still another embodiment.
Figure 12:
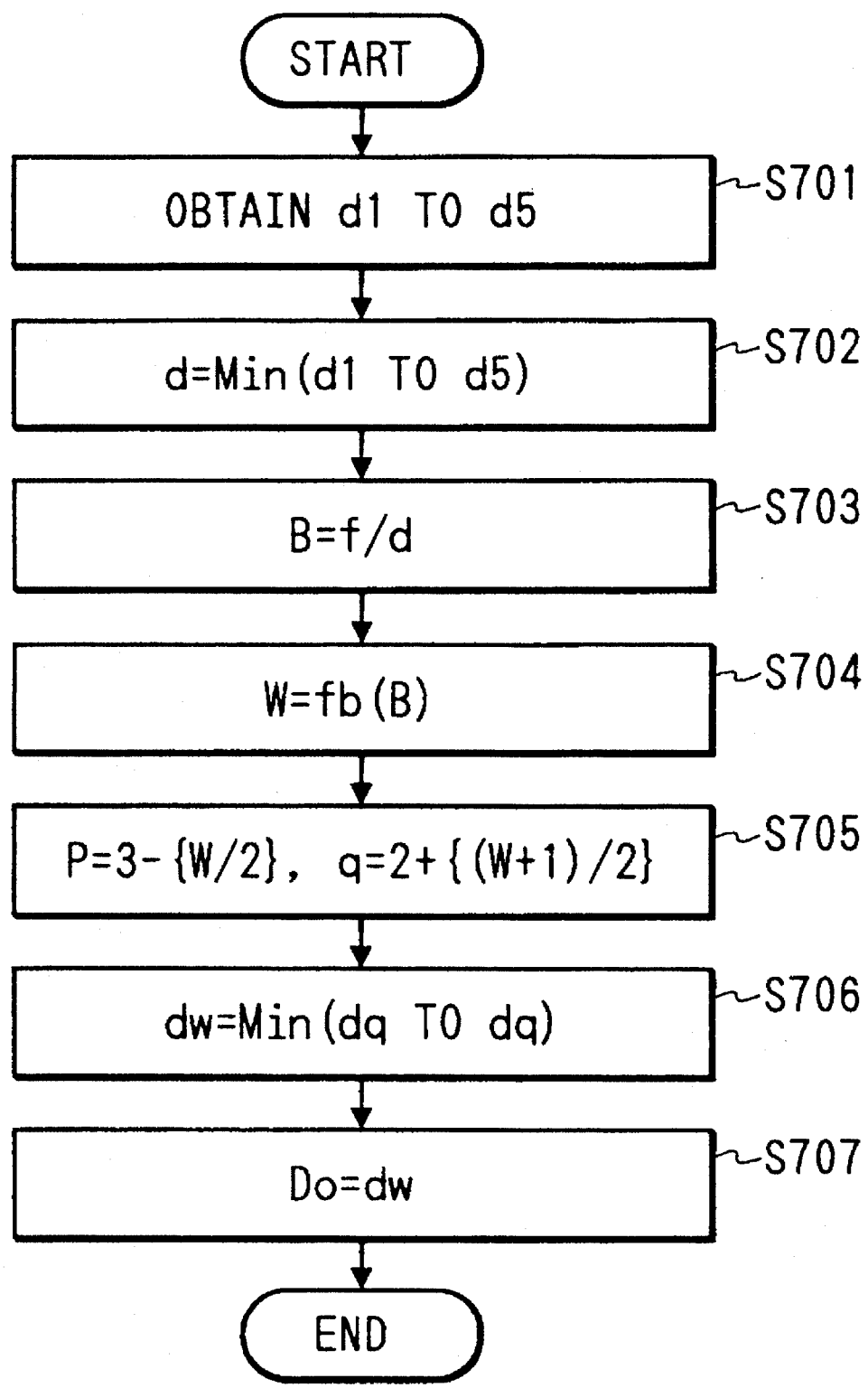
FIG. 12 is a flow chart showing the algorithm of the distance measurement calculating device 6 of FIG. 1 in said still another embodiment.

FIG. 11 is a graph showing the relation between the closest magnification B and the distance measuring area width W. FIG. 12 is a flow chart showing the algorithm of the distance measurement calculating device 6 of FIG. 1.

In the graph of FIG. 11, the abscissa represents the closest magnification B calculated from the closest value d and the focal length f of the photo-taking lens, and the ordinate represents the distance measuring area width W indicating how many of the five distance measuring areas e1–e5 are used for distance measurement. Four threshold values for dividing the value of the closest magnification B into four are determined in such a fashion that when the closest magnification B is smaller than a certain threshold value, the closest value dW is adopted as the distance measuring area width W from among the five distance measuring areas e1–e5 (W=5), and when the closest magnification B becomes greater than a certain threshold value, the closest value dW is adopted as the four distance measuring areas e1–e4 (W=4). The above-described four threshold values which vary the distance measuring area width W from five areas to one area (W=1–5) are determined by a function fb(B) of the closest magnification B.

The distance measuring area width W found from the closest magnification B and the threshold values determined by the function fb(B) as shown in FIG. 11 is substituted for the following equations (4) and (5), whereby distance measuring areas ep-eq are found from among the distance measuring areas e1–e5.

The left area position p is $$p=3-\{W/2\} \quad (4)$$

The right area position q is $$q=2+\{(W+1)/2\} \quad (5)$$

The figures below the decimal point in { } are omitted.

By doing so, the distance measuring area width W can be set to two to four areas for a scene to be photographed intermediate of a close-up scene to be photographed and an ordinary scene to be photographed.

The processing by the distance measurement calculating device 6 will hereinafter be described with reference to FIG. 12.

At a step S701, a plurality of measured distance values d1–d5 are obtained.

At a step S702, the closest value d of the measured distance values d1–d5 is calculated.

At a step S703, the closest magnification B is found from the closest valued and the focal length f of the photo-taking lens.

At a step S704, the distance measuring area width W is found from the closest magnification B and the threshold values determined by the function fb(B) as shown in FIG. 11.

At a step S705, the left distance measuring area position p and the right distance measuring area position q are calculated from the distance measuring area width W on the basis of equations (4) and (5).

At a step S706, the closest value dw is found from measured distance values dp–dq.

At a step S707, the closest value dw is stored into the final distance measurement result $D_0$.

The camera drives the lens 2 in accordance with this final result $D_0$.

The embodiments of the present invention have been described with respect to an example of the fired lens type camera in which the focal length f of the photo-taking lens 2 is stored in the distance measurement calculating device 6 in the camera body, but in an interchangeable lens type camera, design can be made such that the interchangeable lens is endowed with focal length information and this focal length information can be used in the camera body.

In the embodiments of the present invention, use is made of an outdoor daylight type passive triangular distance measuring apparatus, but any automatic distance measuring apparatus such as a TTL type or outdoor daylight type active triangular distance measuring apparatus would be applicable to a camera in which a plurality of areas are distance-measured.

As described above, according to the present invention, the distance measuring areas are selected on the basis of the photographing magnification of an object, whereby photographing can be effected with good focus irrespective of photographing conditions.

Particularly, whether photographing should be close-up photographing or ordinary photographing is judged from the photographing magnification of the closest object, and in case of close-up photographing, the central measured distance value is adopted, and in case of ordinary photographing, the closest value of the whole is adopted and therefore, photographing with a better focus for a main object becomes possible irrespective of the object.

Yet still another embodiment of the present invention will hereinafter be described in detail with reference to the drawings.

Figure 13:
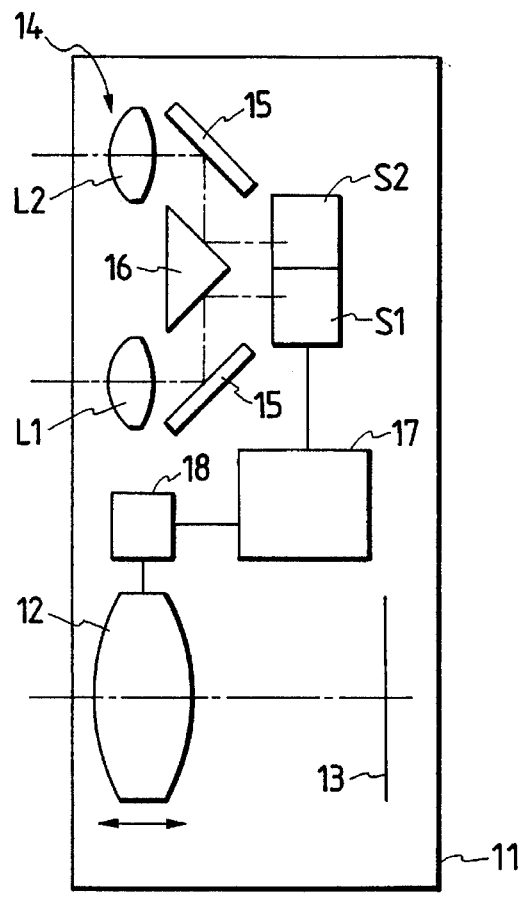
FIG. 13 is an illustration showing a camera provided with an embodiment of the auto focusing apparatus of the present invention.

FIG. 13 shows a camera in which there is disposed an embodiment of the auto focus apparatus of the present invention.

In this camera, object light passed through a photo-taking lens 12 disposed in a camera body 11 is imaged on a film surface 13.

An AF optical system 14 of the passive triangular distance measurement type is disposed in the upper portion of the camera body 11, and the object light passes through a pair of distance measuring lenses L1 and L2 and is reflected by mirrors 15 and 16, and thereafter is detected as two images on image sensors S1 and S2.

The two object images detected by these image sensors S1 and S2 are sent to a distance measurement calculating device 17 comprised of a microprocessor or the like.

In the distance measurement calculating device 17, the distance to the object is obtained from the spacing between the detected object images.

In conformity with the result of the distance measurement by this distance measurement calculating device 17, the photo-taking lens 12 is driven by a lens driving device 18 and is focused on the object.

Figure 14:
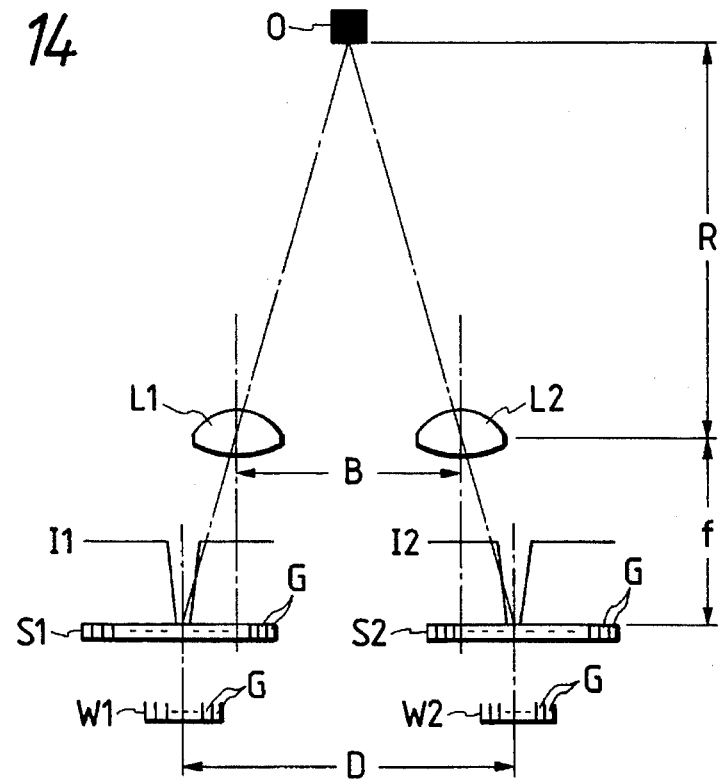
FIG. 14 is an illustration showing the principle of distance measurement of the auto focusing apparatus of FIG. 13.

Referring to FIG. 14 which shows the principle of distance measurement in this embodiment, the object O is imaged on the image sensors S1 and S2 through the distance measuring lenses L1 and L2, and the image sensors S1 and S2 put out sensor outputs I1 and I2 conforming to the intensities of the object images.

Correlation windows W1 and W2 smaller than the widths of the image sensors S1 and S2 are virtually set, and the correlation between the sensor outputs I1 and I2 is calculated in these correlation windows W1 and W2.

In the present embodiment, the image sensors S1 and S2 each have twenty pixels G, and the correlation windows W1 and W2 each have a length corresponding to ten pixels.

The interval D between these correlation windows W1 and W2 (hereinafter referred to as the correlation window interval D) corresponds to the distance to the object O, and becomes small on the far side and becomes great on the near side.

Here, when the focal lengths of the distance measuring lenses L1 and L2 are f and the spacing therebetween is B, the relation between the distance R from the object O to the distance measuring lenses L1, L2 and the correlation window interval D is as follows:

$$R = f \cdot B/(D-B) \tag{6}$$

Figure 15:
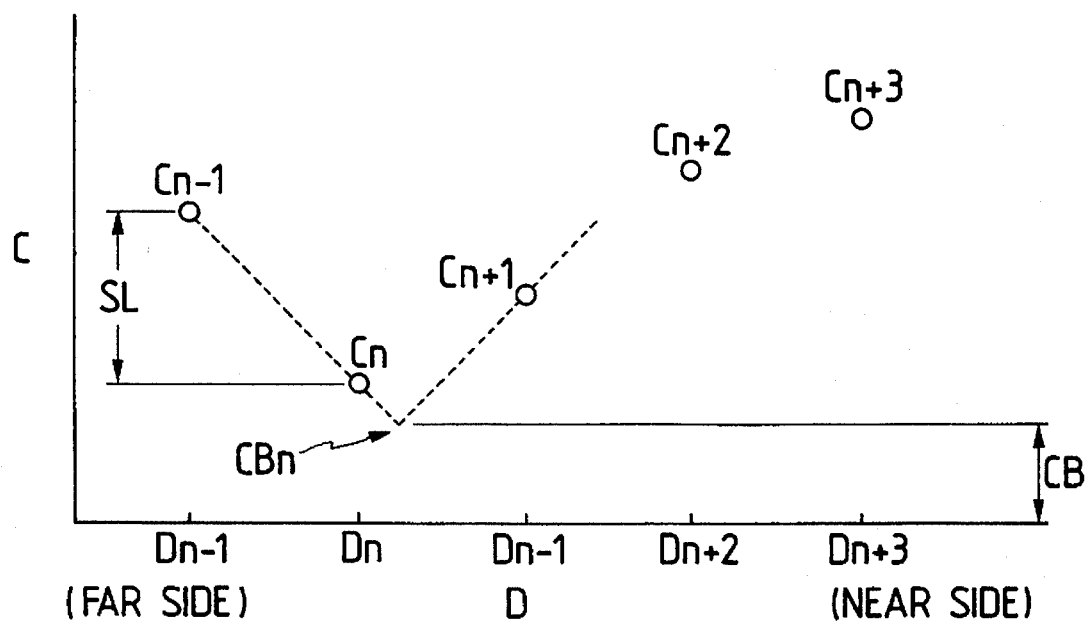
FIG. 15 is a graph showing the relation between the correlation value and the correlation window interval.

FIG. 15 shows a variation in the correlation value C when the correlation window interval D is changed when the object O exists at a particular distance.

The correlation value C is the sum total of the absolute value of the difference between the sensor outputs I1 and I2 in the correlation windows W1 and W2, and assumes the smallest value at a position whereat the two are most coincident with each other.

In FIG. 15, that position is a position Dn and the correlation value at this position is Cn.

At this time, as shown in FIG. 15, the correlation value C is discretely found at the pixel unit of the image sensors S1 and S2 and further, interpolation calculation is effected by the use of several points before and after the minimum value of the correlation, whereby it is possible to find even an amount below one pixel.

Whether the valley CBn of this correlation should be adopted is determined by the sharpness of the valley of this correlation and the height of the minimum value of the valley.

That is, when Cn−1 is greater than Cn+1, if the sharpness SL of the valley of the correlation is $$SL = Cn-1-Cn \tag{7}$$

and the bottom CB of the valley of the correlation is $$CB = Cn-[(Cn-1-Cn+1)/2], \tag{8}$$

in the present embodiment, judgment values HSL and HCB for the sharpness SL of the valley of the correlation and the bottom CB of the valley of the correlation judge that the object O exists at this position when the judgment values are the functions HSL(D) and HCB(D) of the correlation window interval D and the found sharpness SL of the valley of the correlation is greater than the judgment value HSL(D) and the bottom CB of the valley of the correlation is lower than the judgment value HCB(D).

Figure 16:
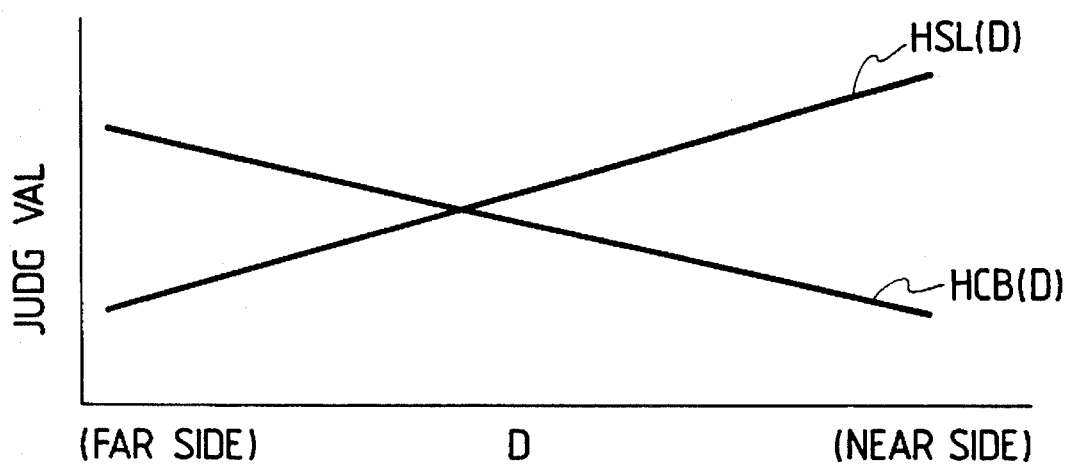
FIG. 16 is a graph showing the judgment value of the sharpness of the valley of the correlation and the judgment value of the bottom of the valley of the correlation.

FIG. 16 shows the functions HSL(D) and HCB(D) of the judgment values, and these functions are preset.

In the present embodiment, design is made such that the judgment value HSL(D) of the sharpness SL of the valley of the correlation becomes great when the correlation window interval D becomes great (the distance of the object O becomes short) and on the near side, the presence of the object O is not recognized unless the valley of the correlation is sharp and that the judgment value HCB(D) of the bottom CB of the valley of the correlation becomes low when the correlation window interval D becomes great (the distance of the object O becomes short) and on the near side, the presence of the object O is not recognized unless the bottom of the valley of the correlation is low.

The function HSL(D) of the judgment value, for example, on the near side, is set so as to be about two to three times the far side, and the function HCB(D), for example, on the far side, is set so as to be about two to three times the near side.

Figure 17:
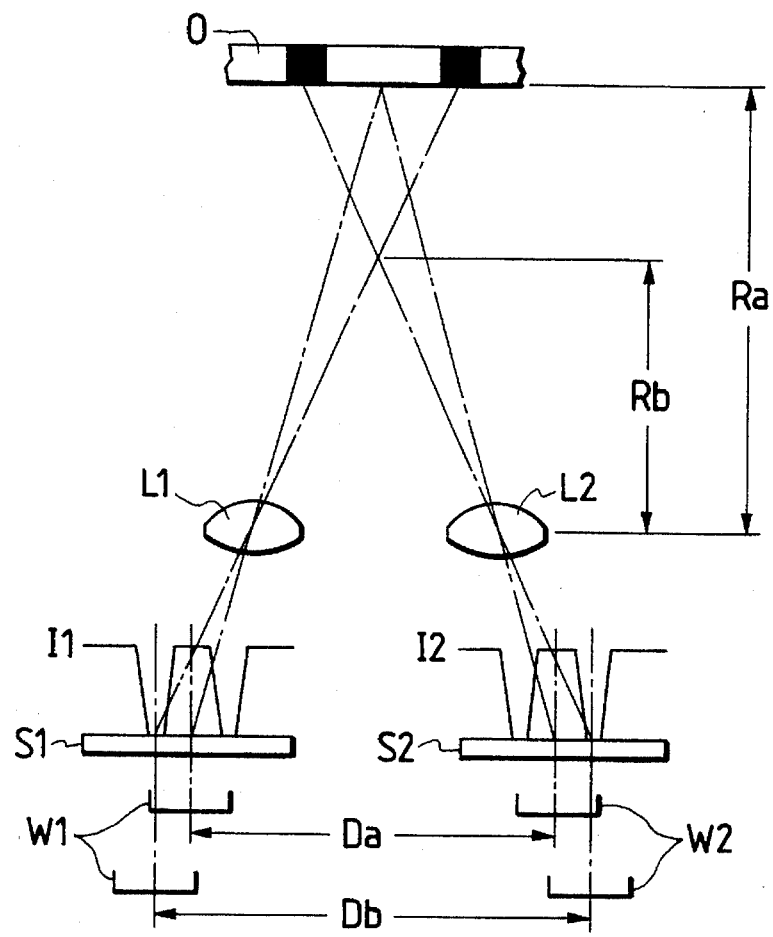
FIG. 17 is an illustration showing a case where false focusing occurs.

FIG. 17 shows a state in which an object O causing false focusing is distance-measured.

Figure 18:
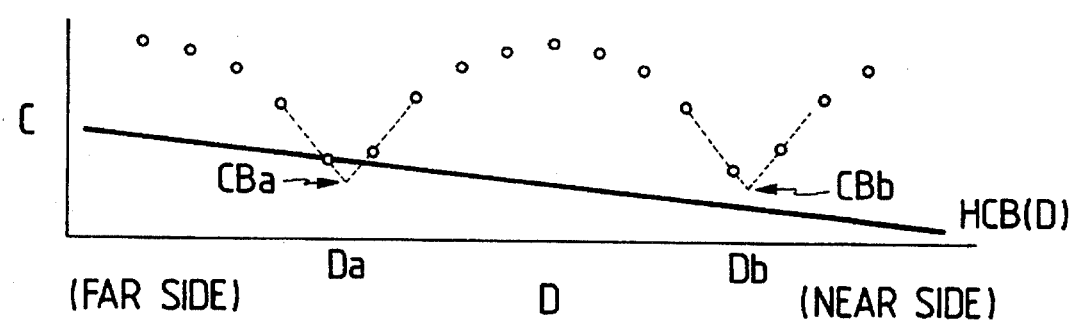
FIG. 18 is a graph showing the relation between the correlation value and the correlation window interval in FIG. 17.

In the present embodiment, white and black patterns are formed at predetermined intervals on the object O, and when the correlation windows W1 and W2 are moved, the valleys CBa and CBb of the correlation are created at positions whereat the correlation window interval D is Da and Db, as shown in FIG. 18.

That is, the true position of the object O is the position Da and the focal length at this time is Ra, but since white and black patterns are formed on the object O, the valley CBb of the correlation is created also at the position Db, and the focal length at this time is Rb.

Due to the irregularity of the sensitivity of the image sensors S1 and S2 and the irregularity of the reflection characteristic of the object O, the valley CBb of the correlation sometimes becomes lower than the valley CBa of the correlation, as shown in FIG. 18, and if in such a case, the judgment values are made constant, the valley CBb of the correlation will be adopted and the measurement distance will become Rb and thus, a wrong measurement distance will be obtained.

So, in the present embodiment, as shown in FIG. 16, the judgment value HSL(D) and the judgment value HCB(D) are varied, whereby the valley CBb of the correlation is prevented from being adopted.

The details of the auto focusing apparatus of the present embodiment will hereinafter be described with reference to the flow charts of FIGS. 19 to 2.

Figure 19:
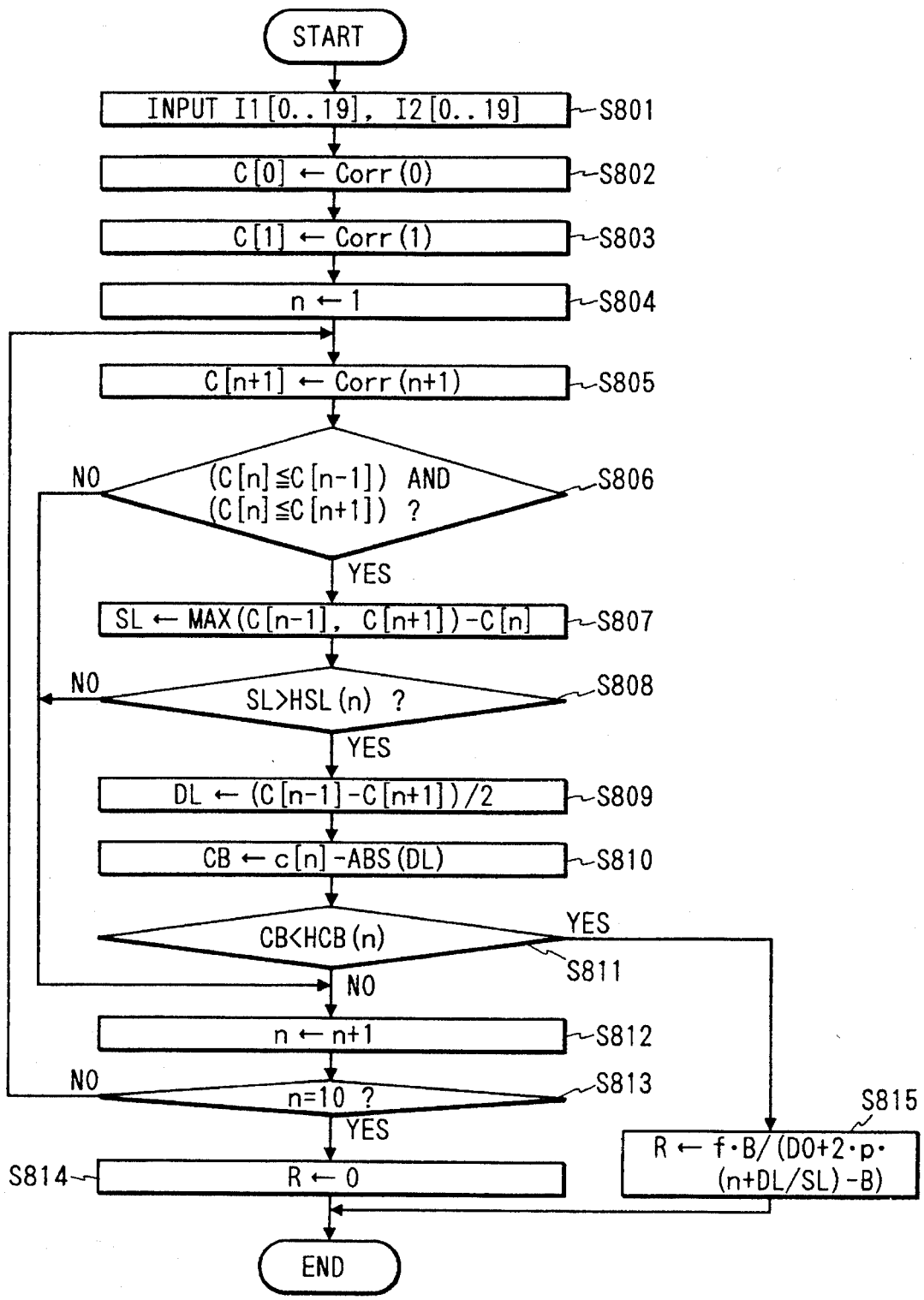
FIG. 19 is a flow chart of the auto focusing apparatus of FIG. 13.

FIG. 19 shows a main routine for distance measurement, and here is shown a case where distance measurement is effected with the correlation windows W1 and W2 corresponding to ten pixels being supposed for the left and right image sensors S1 and S2 each having twenty pixels.

The data of the twenty pixels of the image sensors S1 and S2 are first read into arrangement variables I1 [0.. 19] and I2 [0.. 19] (step S801).

Subsequently, two correlation values C are calculated from the smallest interval between the correlation windows W1 and W2 by the function Corr(n) of correlation calculation shown in FIG. 20, and are stored into arrangement variables C[0] and C[1] (steps S802 and S803).

Figure 20:
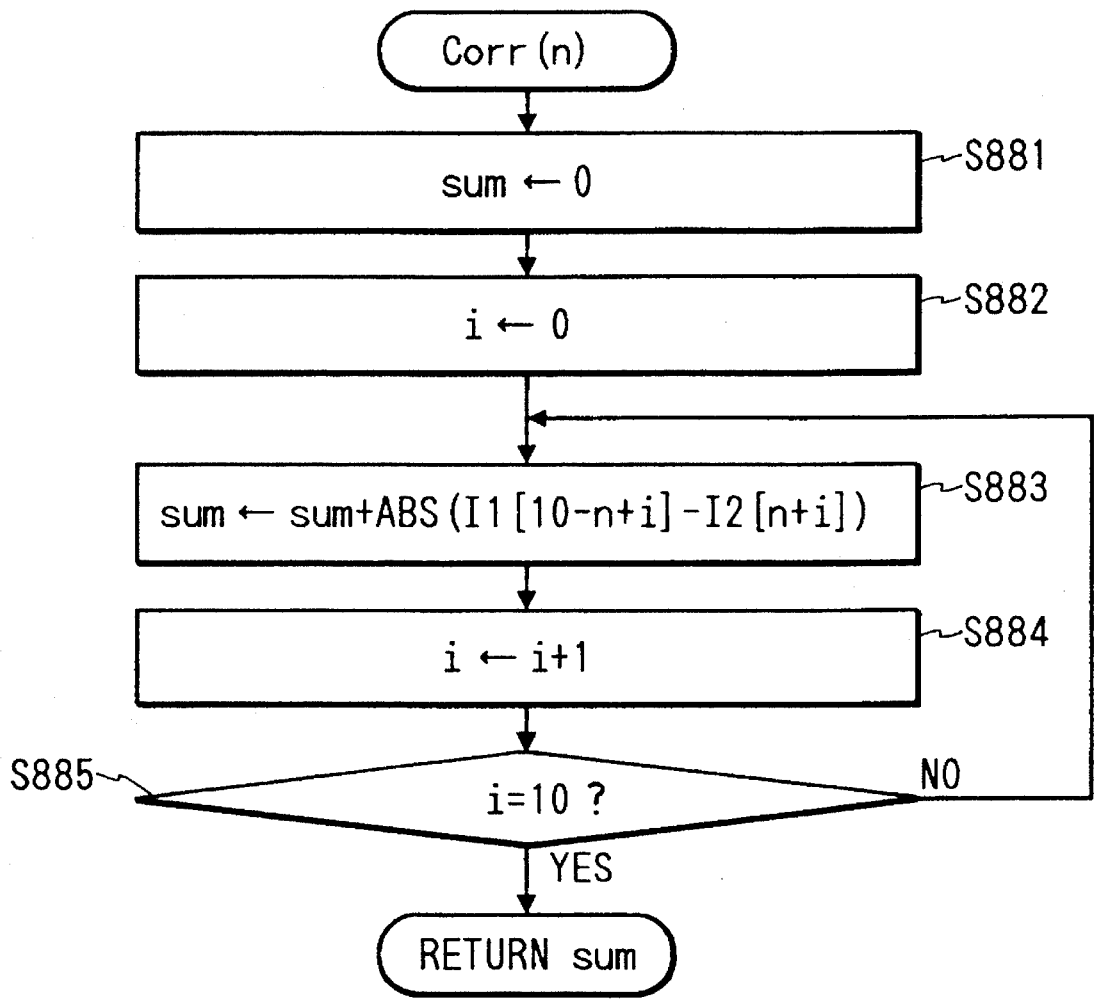
FIG. 20 is a flow chart showing a calculation for finding the value of a function Corr(n).

The calculation of the function Corr(n) of correlation calculation is effected by setting the correlation windows W1 and W2 of ten pixels out of twenty pixels by an argument n and calculating the sum total of the absolute values of the differences therebetween, as shown at the steps S881 to S885 of FIG. 20.

As regards the argument n, when it is 0, the interval between the correlation windows W1 and W2 is made narrowest, and each time the argument is increased by 1, in the left image sensor S1 shown in FIG. 14, the correlation window W1 moves to left by one pixel, and in the right image sensor S2, the correlation window W2 moves to right by one pixel.

To further enhance accuracy, the movement of the correlation windows W1 and W2 may be effected by one pixel alternately to left and right, or only one of the correlation windows W1 and W2 may be moved.

Subsequently, as the initial positions of the correlation windows W1 and W2, 1 is set in n (step S804).

Thereafter, a newly calculated correlation value is stored into an arrangement variable C[n+1] (step S805).

Subsequently, whether the arrangement variable C[n] is smaller than C[n−1] and C[n+1] is judged (step S806).

When C[n] is smaller than C[n−1] and C[n+1], the sharpness SL of the valley of the correlation is calculated (step S807).

Subsequently, the sharpness SL of the valley of the correlation is compared with the function HSL(n) of the judgment value shown in FIG. 21, and whether this position should be adopted is judged (step S808).

Figure 21:
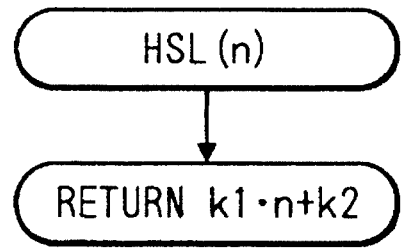
FIG. 21 is a flow chart showing a calculation for finding the value of a function HSL(n).

In the present embodiment, as shown in FIG. 21, the function HSL(n) of the judgment value is made into a linear equation, and coefficients k1 and k2 are preset to optimum values in conformity with the distance measuring optical system used.

When the sharpness SL of the valley of the correlation is greater than the function HSL(n) of the judgment value, the value of DL used for interpolation calculation is found (step S809).

This value of DL is a value corresponding to the second term of the above-mentioned equation (5).

Subsequently, the bottom CB of the valley of the correlation is calculated from DL (step S810).

Figure 22:
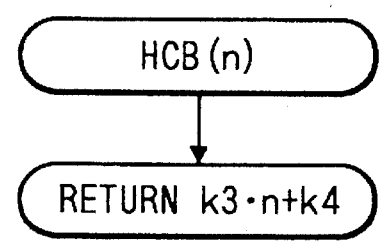
FIG. 22 is a flow chart showing a calculation for finding the value of a function HCB(n).

Thereafter, the bottom CB of the valley of the correlation is compared with the function HCB(n) of the judgment value shown in FIG. 22, and whether this position should be adopted is judged (step S811).

In the present embodiment, as shown in FIG. 22, the function HCB(n) of the judgment value, like HSL(n), is made into a linear equation, and coefficients k3 and k4 are preset to optimum values in conformity with the distance measuring optical system used.

When the value of the bottom CB of the valley of the correlation is greater than the function HCB(n), the value of n for setting the positions of the correlation windows W1 and W2 is increased by 1 (step S812).

Thereafter, whether the correlation windows W1 and W2 are in their terminated positions is judged (step S813), and if they are not in their terminated positions, return is made to the step S805.

If the correlation windows W1 and W2 are in their terminated positions, it is a case where decisive correlation could not be taken at any distance, like a case where there is no definite pattern on the object O, and therefore the distance of the object O is regarded as being unknown and here, O is stored into the object distance R (step S814), and the routine is an ended.

On the other hand, if at the step S811, CB is smaller than HCB(n), it is a case where it has been judged that n at this time is the position at which the object O exists and therefore, the object distance R is found up to below one pixel by interpolation calculation by the use of n, SL and DL (step S815), and the routine is ended.

Here, f is the focal length of the distance measuring lenses L1 and L2, B is the spacing between the distance measuring lenses L1 and L2, D0 is the initial value of the interval between the correlation windows W1 and W2, and p is the spacing between the pixels of the image sensors S1 and S2.

Thus, in the auto focusing apparatus in the camera constructed as described above, the function HCB(D) of the correlation window interval D is used as the judgment value and therefore, as shown in FIG. 18, CBa assumes a position lower than the judgment value HCB(D) and CBb assumes a position higher than the judgment value HCB(D) and as a result, CBa satisfies the judgment value, and Da corresponding to the true position of the object O is adopted as the correlation window interval D and thus, the focus can be reliably prevented from greatly deviating relative to an object which will cause false focusing.

Also, in the present embodiment, design is made such that the bottom CB of the valley of the correlation is judged from the judgment value HCB(D) and the sharpness SL of the valley of the correlation is also judged from the judgment value HSL(D) and therefore, the focus can be more reliably prevented from greatly deviating relative to an object O which will cause false focusing.

Further, in the present embodiment, design is made such that the functions HCB(D) and HSL(D) of the judgment value are made into linear equations and judgment is done severely on the near side and therefore, even in case of an object O such as a periodic pattern which will cause false focusing, it becomes possible to reliably prevent the lens from being focused extremely on the near side by mistake.

Figure 23:
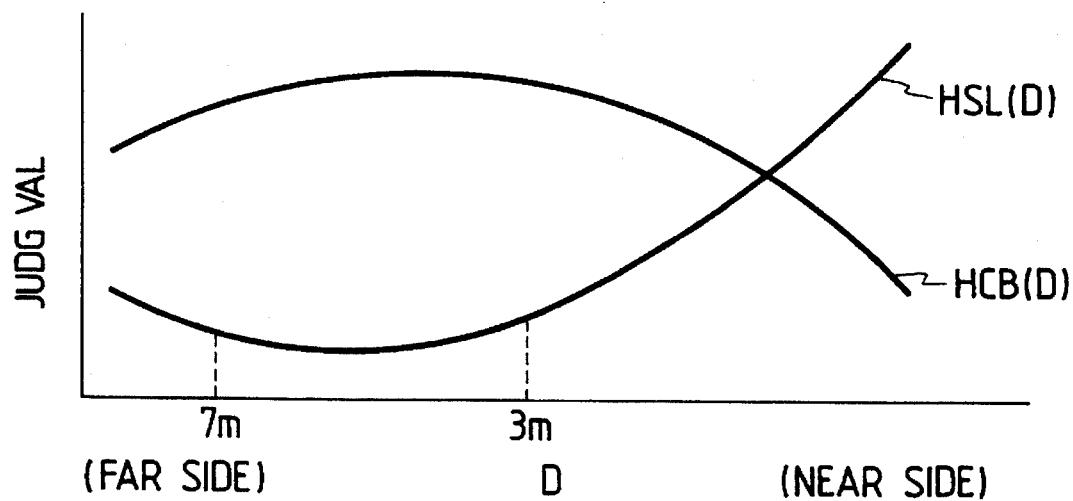
FIG. 23 is a graph showing the judgment value of the sharpness of the valley of the correlation and the judgment value of the bottom of the valley of the correlation in another embodiment of the auto focusing apparatus of the present invention.

FIG. 23 shows a judgment value HCB(D) and a judgment value HSL(D) set in another embodiment of the present invention, and in this embodiment, the judgment value HCB(D) is made into a quadratic function of $k1n^2+k2n+k3$ and the judgment value HSL(D) is made into a quadratic function of $k4n^2+k5n+k6$.

At a distance of e.g. 3–7 m commonly used, for example, in portrait photographing, the judgment values are set so as to be gentle values.

By so setting the judgment values, it becomes possible to reliably prevent the lens from being focused extremely on the near side by mistake, for example, in portrait photographing.

While the above embodiments have been described with respect to an example in which the judgment values are set by linear equations or quadratic equations, the present invention is not restricted to such embodiments, but of course, the judgment values may be set by third or higher order equations or may be set stepwise or otherwise.

Also, the above embodiments have been described with respect to an example in which the functions of the judgment values are preset to predetermined functions, whereas the present invention is not restricted to such embodiments, but of course, for example, in cameras which can select modes such as portrait photographing and landscape photographing, the functions of the judgment values may be made changeable by the selection of these modes.

Further, the above embodiments have been described with respect to an example in which the present invention is applied to a camera of outdoor daylight type auto focus, whereas the present invention is not restricted to such embodiments, but of course, can also be applied, for example, to cameras of TTL type auto focus used in single-lens reflex cameras.

As described above, in the auto focusing apparatus in the camera according to the present invention, design is made such that the judgment values which determine the propriety of the in-focus position are varied in conformity with the object distance and therefore, the focus can be reliably prevented from greatly deviating relative to an object which will cause false focusing.

The judgment values are varied so as to be gently set at a commonly used distance, whereby the in-focus position at the commonly used distance can be preferentially adopted and the focus can be reliably prevented from greatly deviating at the commonly used distance.

Also, the judgment values are varied so as to be severely set on the near side, whereby even in case of an object such as a periodic pattern which will cause false focusing, the possibility of the lens being focused on the near side by mistake is reduced.

What is claimed is:

1. An auto focusing apparatus in a camera comprising:

detecting means for detecting the measured distance values of an object corresponding to a plurality of areas in a photographing image field;

first determining means for determining a first measured distance value which is the measured distance value of the shortest distance from the plurality of measured distance values detected by said detecting means;

comparing means for comparing the first measured distance value determined by said first determining means with a threshold value;

second determining means for determining the mean value of the plurality of measured distance values detected by said detecting means as a second measured distance value; and driving means for driving a photo-taking lens on the basis of said first measured distance value when it is judged by said comparing means that said first measured distance value is smaller than said threshold value, and driving the photo-taking lens on the basis of said second measured distance value when it is judged by said comparing means that said first measured distance value is equal to or greater than said threshold value.

2. An auto focusing apparatus in a camera according to claim 1, further comprising:

threshold value changing means for changing said threshold value on the basis of the characteristic of said photo-taking lens.

3. An auto focusing apparatus in a camera comprising:

detecting means for detecting the measured distance values of an object corresponding to a plurality of areas in a photographing image field;

first determining means for determining a first measured distance value which is the measured distance value of the shortest distance from the plurality of measured distance values detected by said detecting means;

second determining means for determining the mean value of the plurality of measured distance values detected by said detecting means as a second measured distance value;

third determining means for determining the adaptivity of each of said first and second measured distance values, weighting said adaptivity to said first and second measured distance values and determining a third measured distance value; and driving means for driving a photo-taking lens on the basis of said third measured distance value.

4. An auto focusing apparatus in a camera according to claim 3, wherein said third determining means determines the third measured distance value by fuzzy calculation.

5. An auto focusing apparatus in a camera according to claim 3, further comprising:

adaptivity changing means for changing said adaptivity on the basis of the characteristic of said photo-taking lens.

6. An auto-focusing method in a camera, of driving a photographing lens on the basis of an output from detecting means for detecting measured distance values of an object corresponding to a plurality of areas in a photographing image plane, comprising the steps of:

determining a first measured distance value as the shortest value in the plurality of measured distance values detected by said detecting means;

determining a second measured distance value as an average value of the plurality of measured distance values detected by said determining means; and driving said photographing lens on the basis of the first measured distance value when the first measured distance value is less than a threshold value, and on the basis of the second measured distance value when the first measured distance value is equal to or greater than the threshold value.

7. An auto-focusing method in a camera, of driving a photographing lens on the basis of an output from detecting means for detecting measured distance values of an object corresponding to a plurality of areas in a photographing image plane, comprising the steps of:

determining a first measured distance value as the shortest value in the plurality of measured distance values detected by said detecting means;

determining a second measured distance value as an average value of the plurality of measured distance values detected by said detecting means; and determining an adaptivity of each of the first and the second measured distance values, and weighting the adaptivity to the first and the second measured distance values to determine a third measured distance value; and driving the photographing lens on the basis of the third measured distance value.

8. An auto focusing apparatus in a camera comprising:

a detecting device which detects the measured distance values of an object corresponding to a plurality of areas in a photographing image field;

a first determining circuit which determines a first measured distance value which is the measured distance value of the short distance from the plurality of measured distance values detected by said detecting device;

a comparing circuit which compares the first measured distance value determined by said first determining circuit with a predetermined value;

a second determining circuit which determines the statistically processed value of the plurality of measured distance values detected by said detecting device as a second measured distance value; and a driving device which drives a photo-taking lens on the basis of said first measured distance value when it is judged by said comparing circuit that said first measured distance value is smaller than said predetermined value, and driving the photo-taking lens on the basis of said second measured distance value when it is judged by said comparing circuit that said first measured distance value is equal to or greater than said predetermined value.

9. An auto focusing apparatus in a camera comprising:

a detecting device which detects the measured distance values of an object corresponding to a plurality of areas in a photographing image field;

a first determining circuit which determines a first measured distance value which is the measured distance values of the short distance from the plurality of measured distance values detected by said detecting device;

a second determining circuit which determines the statistically processed value of the plurality of measured distance values detected by said detecting device as a second measured distance value;

a third determining circuit which determines the adaptivity of each of said first and second measured distance values, weighting said adaptivity to said first and second measured distance values and determining a third measured value; and a driving device which drives a photo-taking lens on the basis of said third measured distance value.

10. An auto-focusing method in a camera, driving a photographing lens on the basis of an output from a detecting device which detects measured distance values of an object corresponding to a plurality of areas in a photographing image plane, comprising the steps of:

determining a first measured distance value as the shortest value in the plurality of measured distance values detected by said detecting device;

determining a second measured distance value as a statistically processed value of the plurality of measured distance values detected by said detecting device; and driving said photographing lens on the basis of the first measured distance value when the first measured distance value is less than a predetermined value, and on the basis of the second measured distance value when the first measured distance value is equal to or greater than the predetermined value.

11. An auto-focusing method in a camera, of driving a photographing lens on the basis of an output from a detecting device which detects measured distance values of an object corresponding to a plurality of areas in a photographing image plane, comprising the steps of:

determining a first measured distance value as the shortest value in the plurality of measured distance values detected by said detecting device;

determining a second measured distance value as a statistically processed value of the plurality of measured distance values detected by said detecting device;

determining an adaptivity of each of the first and the second measured distance values, and weighting the adaptivity to the first and the second measured distance values to determine a third measured distance value; and driving said photographing lens on the basis of the third measured distance value.

12. An auto focusing apparatus in a camera comprising:

a detecting device which detects information based upon distances to an object at a plurality of areas in a photographing image field;

a first determining circuit which determines first information on the basis of the detected information, said first information relating to a short distance to the object;

a comparing device which compares the first information detected by said first determining circuit with information relating to a predetermined value;

a second determining circuit which statistically processes the detected information to determine second information; and a driving device which drives a photo-taking lens on the basis of either one of the first information and the second information, in accordance with the result of the comparison in said comparing device.

13. An auto-focusing method comprising the steps of:

detecting information based upon distances to an object at a plurality of areas in a photographing image field;

determining first information on the basis of the detected information, said first information, relating to the shortest distance to the object;

statistically processing the detected information to determine second information; and comparing the first information detected by said first determining circuit with information relating to a predetermined value; and driving a photo-taking lens on the basis of either one of the first information and the second information, in accordance with the result of the comparison in said comparing device.

14. An auto focusing apparatus in a camera comprising:

a detecting device which detects information based upon distances to an object at a plurality of areas in a photographing image field;

a first determining circuit which determines first information on the basis of the detected information, said first information relating to a short distance to the object;

a second determining circuit which statistically processes the detected information to determine second information;

a third determining circuit which determines each adaptivity to the first and the second information, and determines third information by weighting the adaptivity to the first and the second information; and a driving device which drives a photo-taking lens on the basis of the third information.

15. An auto-focusing method comprising the steps of:

detecting information based upon distances to an object at a plurality of areas in a photographing image field;

determining first information on the basis of the detected information, said first information relating to the shortest distance to the object;

determining second information relating to a calculated value based upon the detected information;

determining each adaptivity to the first and the second information, and determines third information by weighting the adaptivity to the first and second information; and driving a photo-taking lens on the basis of the third information.

* * * * *